United States Patent [19]

Kojima et al.

[11] Patent Number: 5,587,254

[45] Date of Patent: Dec. 24, 1996

[54] ALKALINE BATTERY HAVING A GELLED NEGATIVE ELECTRODE

[75] Inventors: Yuri Kojima, Katano; Yuji Mototani, Yawata; Junichi Asaoka, Ikoma, all of Japan

[73] Assignee: Matsushita Electric Industrial Co., Ltd., Osaka, Japan

[21] Appl. No.: 419,054

[22] Filed: Apr. 7, 1995

[30] Foreign Application Priority Data

Apr. 21, 1994 [JP] Japan .................................. 6-083089

[51] Int. Cl.⁶ .............................. H01M 4/24; H01M 4/62
[52] U.S. Cl. ........................... 429/206; 429/207; 429/229
[58] Field of Search .................................... 429/206, 207, 429/229

[56] References Cited

U.S. PATENT DOCUMENTS 4,963,447 10/1990 Nishimura et al. ..................... 429/206

FOREIGN PATENT DOCUMENTS

0414990A1  3/1991  European Pat. Off. .
2119053A   5/1990  Japan .

OTHER PUBLICATIONS

Derwent Publications Ltd., London, GB; AN 95-142298 & JP-A-7 065 817 (Matsushita) (no month).
Derwent Publications Ltd., London, GB; AN 95-142299 & JP-A-7 065 818 (Matsushita) (no month).

Primary Examiner—Prince Willis, Jr.
Assistant Examiner—Carol Chaney
Attorney, Agent, or Firm—Watson Cole Stevens Davis, P.L.L.C.

[57] ABSTRACT

Vibration and shock resistance of alkaline batteries provided with a gel type negative electrode comprising a zinc alloy powder, a gelling agent and an alkaline electrolyte can be improved by using the following three gelling agents in combination in the gel type negative electrode, namely, a crosslinked polyacrylate type water-absorbing polymer having a dispersion viscosity at 25° C. of at least 15,000 cps as a 0.5 wt % aqueous solution and having a particle size of mainly 100–900 microns, a crosslinked and branched type polyacrylic acid or a salt thereof having a dispersion viscosity at 25° C. of at least 15,000 cps as a 0.5 wt % aqueous solution and having a particle size of mainly 100 microns or smaller, and a granular crosslinked and branched type polyacrylic acid or a salt thereof having a dispersion viscosity at 25° C. of at least 15,000 cps as 0.5 wt % aqueous solution and having a particle size of mainly 100–900 microns. The vibration and shock resistance can further be improved by further adding to the gel type negative electrode at least one of oxides, hydroxides and sulfides of a metal selected from indium, tin and bismuth.

6 Claims, 1 Drawing Sheet

ALKALINE BATTERY HAVING A GELLED NEGATIVE ELECTRODE

BACKGROUND OF THE INVENTION

1. Field of the Invention

The present invention relates to alkaline batteries having a gel type negative electrode and more particularly to the improvement of a gelling agent for the gel type negative electrode.

2. Description of Related Art

As the gelling agent, crosslinked and branched type polyacrylic acids or sodium salts thereof have been generally used. The crosslinked and branched type polyacrylic acids uniformly disperse zinc particles in the gel type negative electrode due to the high viscosity of the acids (e.g., JP2-119053A). Furthermore, they increase contacts between zinc particles per se and between zinc particles and current collectors to enhance current collecting effect.

In order to inhibit corrosion of zinc and maintain the shelf stability of batteries, amalgamated zinc comprising zinc particles to which mercury is added has been used. The mercury added enhances the current collecting effect by increasing contacts between zinc particles per se and between zinc particles and current collectors. However, the amount of mercury contained in negative electrodes of batteries must be reduced for protection from environmental pollution. When mercury is removed from zinc particles, contacts between zinc particles decrease and if the batteries are subjected to continuous vibration or shock for a long time, zinc particles in the gel type negative electrode move to one side in the negative electrode to cause deterioration in current collecting effect. Moreover, when the batteries are discharged, the surface of zinc particles is converted to zinc oxide owing to the discharging reaction and the particles become smaller and, as a result, the current collecting effect is further deteriorated. Therefore, when the batteries are continuously subjected to vibration and shock for a long time while being discharged, the voltage abruptly drops and dischargeability deteriorates.

SUMMARY OF THE INVENTION

The object of the present invention is to provide alkaline batteries which can withstand strong vibration and shock applied for a long period while being discharged.

DETAILED DESCRIPTION OF PREFERRED EMBODIMENTS

Figure 1:
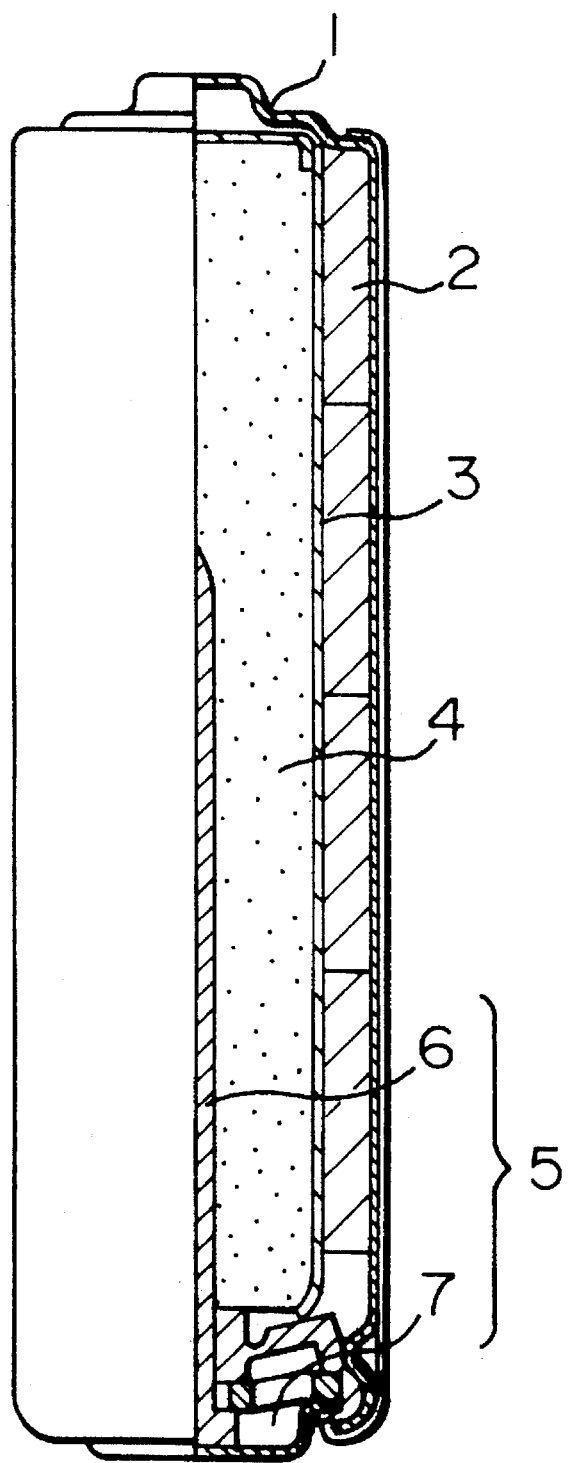
FIG. 1 shows a longitudinal section of an AA type alkaline battery LR6 made in the Example of the present invention.

The present invention relates to alkaline batteries which include a gel type negative electrode comprising an alkaline electrolyte, a gelling agent and zinc particles, characterized in that as the gelling agent there are used in combination the following three gelling agents, namely, a crosslinked polyacrylate type water-absorbing polymer having a dispersion viscosity at 25° C. of at least 15,000 cps as a 0.5 wt % aqueous solution and having a particle size of mainly 100–900 microns, a crosslinked and branched type polyacrylic acid or a salt thereof having a dispersion viscosity at 25° C. of at least 15,000 cps as a 0.5 wt % aqueous solution and having a particle size of mainly 100 microns or smaller and a granular crosslinked and branched type polyacrylic acid or a salt thereof having a dispersion viscosity at 25° C. of at least 15,000 cps as a 0.5 wt % aqueous solution and having a particle size of mainly 100–900 microns. It is further characterized in that at least one of oxides, hydroxides and sulfides of a metal selected from indium, tin and bismuth is contained in the gel type negative electrode comprising mainly the three gelling agents in combination.

According to the present invention, deterioration of vibration and shock resistance caused when the conventional gel type negative electrodes are used is inhibited by using mainly the above-mentioned three gelling agents in combination, and in addition, the vibration and shock resistance is further improved by using at least one of metal compounds selected from indium, tin and bismuth compounds in the said gel type negative electrode comprising mainly the three gelling agents in combination. The crosslinked and branched type polyacrylic acid or salt thereof as a gelling agent has the defect that when it swells in the gel type negative electrode, contact between zinc particles per se decreases due to its low elasticity. A further defect is that when batteries are discharged, zinc particles become smaller, resulting in spaces between the particles, and when vibration and shock are applied while being discharged, the contact between the particles becomes inferior.

The above defects can be solved by adding a crosslinked polyacrylate type water-absorbing polymer having a high elasticity to improve contact between zinc particles per se. Since the crosslinked polyacrylate type water-absorbing polymer of high elasticity has swellability and is high in retention of electrolyte and does not dissolve in alkaline electrolyte, the particles of the gelling agent remain in the gel-like electrolyte, but since the crosslinked and branched type polyacrylic acid which is high in viscosity is soluble in water, the swollen particles dissolve in the electrolyte and do not remain as particles in the electrolyte.

Therefore, in the case of using these two gelling agents, linking between the gelling agents becomes insufficient when vibration and shock are applied, and the characteristics of the elasticity and the viscosity of the respective gelling agents cannot be utilized well. Thus, it is considered that when a granular crosslinked and branched type polyacrylic acid or a salt thereof having both the properties of dissolvability and swellability (namely, the outer portion of swollen particles dissolve in the electrolyte like the crosslinked and branched type polyacrylic acid, but the inner portion remains in the electrolyte like the water absorbing polymer) is added to a gel-like electrolyte comprising the above-mentioned two gelling agents, vibration and shock resistance is further improved.

It is considered that such granular crosslinked and branched type polyacrylic acid or a salt thereof has tackiness because the outer portion of the particles dissolves out and serves to improve the contact of the three gelling agents with zinc particles.

Furthermore, the water-absorbing polymer is high in water-absorbability and releases the electrolyte with difficulty. Therefore, at the final stage of discharging, the electrolyte necessary for discharging is not smoothly supplied to batteries. In this case, when the amount of the water-absorbing polymer is reduced and the granular crosslinked and branched polyacrylic acid is added, the shortage of the electrolyte can be solved.

Accordingly, by using the granular crosslinked and branched type polyacrylic acid in combination with the other two gelling agents, the space is removed due to the tackiness of the gelling agents whereby the contact is strengthened and the electrolyte for discharging is smoothly supplied.

Furthermore, when at least one of oxides, hydroxides and sulfides of metal selected from indium, tin and bismuth is dispersed in the gel type negative electrode, a part of the compound is electrodeposited on the surface of zinc alloy by the principle of displacement plating to improve contact between zinc particles per se and as a result, resistance to vibration and shock applied for a long time while being discharged can be improved.

FIG. 1 is a half section of the cylindrical alkaline battery LR6 used in the example of the present invention. A positive electrode depolarizing mix 2 comprising manganese dioxide and graphite is put in metallic case 1 and separator 3 is inserted therein. Then, gel type negative electrode 4 is poured into the separator 3. Fabrication sealing plate 5 integrally formed of negative electrode current collector 6 and bottom plate 7 is inserted into the gel type negative electrode to form a cell.

The gel type negative electrode is composed of an alkaline electrolyte comprising zinc oxide and 40% aqueous potassium hydroxide solution, the gelling agents and a zinc powder in an amount twice the weight of the electrolyte.

An example of the present invention will be explained. Each 300 g of gel type negative electrodes were prepared by adding to 100 g of an electrolyte the following gelling agents A, B and C in the amounts as shown in Tables 1–5.

Gelling agent A: A crosslinked polyacrylate type water-absorbing polymer having a dispersion viscosity at 25° C. of 20,000 cps as a 0.5 wt % aqueous solution, an average particle size of 500 microns and a particle size of 100–900 microns and a gel strength of 30,000 dye/cm$^2$.

Gelling agent (B): A crosslinked and branched type polyacrylic acid having a dispersion viscosity at 25° C. of 20,000 cps as a 0.5 wt % aqueous solution and a particle size of 100 microns or smaller and an average particle size of 80 microns.

Gelling agent (C): A granular crosslinked and branched type polyacrylic acid having a dispersion viscosity at 25° C. of 20,000 cps as a 0.5 wt % aqueous solution and an average particle size of 450 microns and a particle size of 100–900 microns.

Twenty cylindrical alkaline batteries LR6 containing the resulting gel type negative electrode were prepared and subjected to vibration test.

The vibration test comprises measuring the discharge duration voltage when the battery is dropped 2 cm repeatedly for 1 hour at a rate of one hundred times per 1 minute while being discharged at a loading resistance of 1 Ω. The test results are shown in Tables 1–5.

The gel strength is measured by the following method.

Gel strength: Absorbability of the water-absorbing polymer for physiologic saline (A g/g) is previously measured by tea bag method. (A×0.75) g of physiologic saline is taken in a beaker of 100 cc and with stirring at 600 rpm, 1 g of the water-absorbing polymer (100–900 mesh in particle size) is added thereto to uniformly absorb the physiologic saline to produce a water-absorbing gel having a smooth surface.

This water-absorbing gel is kept at 25° C. and the gel strength thereof is measured using a neocardo-meter under the following operation conditions.

Load: 200 g
Diameter of pressure sensitive axis: 8 mm
Falling speed of pressure sensitive axis: 0.36 cm

TABLE 1

Gelling agent C 0% by weight

| | | Gelling agent B (% by weight) | | | | | | |
|---|---|---|---|---|---|---|---|---|
| | | 0 | 0.1 | 0.25 | 0.50 | 0.75 | 1.0 | 1.25 | 1.50 |
| Gelling agent A (% by weight) | 0 | x | x | x | x | x | x | x | x |
| | 0.25 | x | x | x | x | x | x | x | x |
| | 0.50 | x | x | x | x | x | x | x | x |
| | 0.75 | x | x | x | x | x | x | x | x |
| | 1.00 | x | Δ | Δ | Δ | Δ | Δ | x | x |
| | 1.50 | x | Δ | Δ | Δ | o | Δ | x | x |
| | 1.75 | x | Δ | o | o | o | Δ | x | x |
| | 2.00 | x | Δ | o | o | o | Δ | x | x |
| | 2.25 | x | Δ | o | o | o | Δ | x | x |
| | 2.50 | x | Δ | o | o | Δ | Δ | x | x |
| | 2.75 | x | Δ | Δ | Δ | Δ | Δ | x | — |
| | 3.00 | x | Δ | Δ | Δ | Δ | Δ | — | — |
| | 3.50 | x | x | x | x | x | — | — | — |

TABLE 2

Gelling agent C 0.1% by weight

| | | Gelling agent B (% by weight) | | | | | | |
|---|---|---|---|---|---|---|---|---|
| | | 0 | 0.1 | 0.25 | 0.50 | 0.75 | 1.0 | 1.25 | 1.50 |
| Gelling agent A (% by weight) | 0 | x | x | x | x | x | x | x | x |
| | 0.25 | x | x | x | x | x | x | x | x |
| | 0.50 | x | x | x | x | x | Δ | x | x |
| | 0.75 | x | x | x | x | Δ | Δ | x | x |
| | 1.00 | x | x | x | Δ | Δ | Δ | x | x |
| | 1.50 | x | Δ | o | o | o | Δ | x | x |
| | 1.75 | x | Δ | o | ⊙ | o | Δ | x | x |
| | 2.00 | x | Δ | ⊙ | ⊙ | o | Δ | x | x |
| | 2.25 | x | Δ | o | o | o | Δ | x | x |
| | 2.50 | x | Δ | o | o | Δ | Δ | x | x |
| | 2.75 | x | Δ | Δ | Δ | Δ | Δ | x | — |
| | 3.00 | x | Δ | Δ | Δ | Δ | x | — | — |
| | 3.50 | x | x | x | x | x | — | — | — |

TABLE 3

Gelling agent C 1.0% by weight

| | | Gelling agent B (% by weight) | | | | | | |
|---|---|---|---|---|---|---|---|---|
| | | 0 | 0.1 | 0.25 | 0.50 | 0.75 | 1.0 | 1.25 | 1.50 |
| Gelling agent A (% by weight) | 0 | x | x | x | x | x | x | x | x |
| | 0.25 | x | x | x | Δ | Δ | Δ | x | x |
| | 0.50 | x | Δ | o | o | o | Δ | x | x |
| | 0.75 | x | Δ | ⊙ | ⊙ | o | Δ | x | x |
| | 1.00 | x | o | ⊙ | ⊙ | ⊙ | o | x | x |
| | 1.50 | x | o | ⊙ | ⊙ | ⊙ | o | x | x |
| | 1.75 | x | o | ⊙ | ⊙ | o | Δ | x | x |
| | 2.00 | x | Δ | ⊙ | o | o | Δ | x | x |
| | 2.25 | x | Δ | o | o | Δ | x | x | — |
| | 2.50 | x | Δ | Δ | Δ | x | x | x | — |
| | 2.75 | x | Δ | Δ | x | x | x | — | — |
| | 3.00 | x | x | x | x | x | — | — | — |

TABLE 4

Gelling agent C 2.0% by weight

| Gelling agent A (% by weight) | Gelling agent B (% by weight) | | | | | | | |
|---|---|---|---|---|---|---|---|---|
| | 0 | 0.1 | 0.25 | 0.50 | 0.75 | 1.0 | 1.25 | 1.50 |
| 0 | x | x | x | x | x | x | x | x |
| 0.25 | x | △ | △ | △ | △ | △ | x | x |
| 0.50 | x | △ | ○ | ○ | △ | △ | x | x |
| 0.75 | x | △ | ⊚ | ⊚ | ○ | △ | x | x |
| 1.00 | x | △ | ⊚ | ○ | ○ | △ | x | x |
| 1.50 | x | △ | ○ | ○ | x | x | x | x |
| 1.75 | x | △ | △ | x | x | x | x | — |
| 2.00 | x | x | x | x | x | x | — | — |
| 2.25 | x | — | — | — | — | — | — | — |
| 2.50 | — | — | — | — | — | — | — | — |
| 2.75 | — | — | — | — | — | — | — | — |
| 3.00 | — | — | — | — | — | — | — | — |

TABLE 5

Gelling agent C 3.0% by weight

| Gelling agent A (% by weight) | Gelling agent B (% by weight) | | | | | | | |
|---|---|---|---|---|---|---|---|---|
| | 0 | 0.1 | 0.25 | 0.50 | 0.75 | 1.0 | 1.25 | 1.50 |
| 0 | x | x | x | x | x | x | — | — |
| 0.25 | x | △ | △ | △ | △ | x | — | — |
| 0.50 | x | △ | △ | △ | x | — | — | — |
| 0.75 | x | △ | △ | x | — | — | — | — |
| 1.00 | x | x | x | x | — | — | — | — |
| 1.50 | x | x | x | — | — | — | — | — |
| 1.75 | — | — | — | — | — | — | — | — |
| 2.00 | — | — | — | — | — | — | — | — |
| 2.25 | — | — | — | — | — | — | — | — |
| 2.50 | — | — | — | — | — | — | — | — |
| 2.75 | — | — | — | — | — | — | — | — |
| 3.00 | — | — | — | — | — | — | — | — |

In Tables 1–5, the symbol "⊚⊚" means that voltage behavior was very good (less than 50 mV in voltage drop), "⊚" means that voltage behavior was normal (less than 100 mV in voltage drop), "○" means that voltage behavior was normal (less than 200 mV in voltage drop), "x" means that voltage abruptly dropped (more than 500 mV in voltage drop), and "△" means that the voltage did not completely drop, but showed signs of dropping (200 mV–500 mV in voltage drop).

Table 1 shows the results of test conducted on gel type electrolytes prepared using the two gelling agents A and B. It can be seen from the results that the voltage abnormally drops when one of the gelling agents is used alone while when both the gelling agents A and B are added in a specific amount, the behavior of the voltage can be improved.

Tables 2–5 show the results when the gelling agent C was added. It can be seen that even a small amount, namely, 0.1 g (%) of the gelling agent C improves the vibration and shock resistance as shown in Table 2.

Tables 3–5 show the results when amount of the gelling agent C was increased. According to the results, when amount of the gelling agent C is increased, the vibration and shock resistance is improved, but when the amount is too large, the internal resistance of the gel type negative electrode increases resulting in decrease of voltage.

As can be seen from Table 1, when gelling agent A or B is used alone, the vibration and shock resistance is inferior. When only the gelling agent B is used, elasticity is inferior and furthermore, there is formed a space between zinc particles which become smaller due to the discharging and the contact becomes inferior by application of vibration and shock to cause abrupt decrease of the voltage. In this case, when the gelling agent A high in elasticity is added, flowing of zinc particles caused by application of vibration and shock is prevented by its excellent elasticity and swellability resulting in improvement of contact between the particles. When the gelling agent C is further added, since this gelling agent has the characteristics that the central portion of the particles is hard and the outer portion is soft and has tackiness, the network of zinc particles becomes intimate and the contact is further improved, and thus, the abrupt decrease of voltage can be inhibited.

Furthermore, when the gelling agent A is used alone, owing to the retention of electrolyte by the water-absorbing polymer, shortage of the electrolyte occurs at the end of discharge and the electrolyte necessary for the reaction is supplied with difficulty or becomes insufficient. As a result, discharge cannot be performed smoothly and the voltage suddenly drops. When the gelling agent C having both the dissolvability and swellability is added alone, the voltage drops upon application of vibration.

This is because the gelling agent C has swellability, but this is inferior to the swellability of gelling agent A, and since only the outer portion of the particles dissolves in the electrolyte, the viscosity given is lower than that given by the gelling agent B, and elasticity and tackiness are insufficient. For this reason, when vibration and shock are applied, zinc particles move to one side in the gel type negative electrode to cause deterioration of current collecting effect and sudden dropping of the voltage.

Furthermore, when total amount of the gelling agents is less than 1.50% by weight of the alkaline electrolyte, viscosity of the gel-like electrolyte is low and hence, zinc particles cannot maintain stably dispersed state in the gel-like electrolyte.

When the total amount of the gelling agents exceeds 4.0% by weight of the alkaline electrolyte, the viscosity of electrolyte is too high and internal resistance of the gel type negative electrode increases to cause much dropping of voltage. It can be seen from the test results that performances of alkaline batteries against shock resistance are stabilized when amounts of the three gelling agents usable in combination based on the weight of the alkaline electrolyte are within the following ranges:

Gelling agent A: 0.25% by weight $\leq X \leq 3.0$% by weight

Gelling agent B: 0.1% by weight $\leq Y \leq 1.0$% by weight

Gelling agent C: 0.1% by weight $\leq Z \leq 2.0$% by weight

When the dispersion viscosity of the respective gelling agents as a 0.5 wt % aqueous solution is lower than 15,000 cps, the viscosity of the gel type negative electrode is too low where the concentration of the gelling agent A is 0.25% by weight $\leq X \leq 3.0$% by weight, that of the gelling agent B is 0.1% by weight $\leq Y \leq 1.0$% by weight and that of the gelling agent C is 0.1% by weight $\leq Z \leq 2.0$% by weight, and zinc particles settle out and are separated.

Therefore, the dispersion viscosity as a 0.5 wt % aqueous solution must be 15,000 cps or higher. Furthermore, when the particle size of the gelling agents A and C is smaller than 100 microns, the battery cannot stand vibration and shock and when it is larger than 900 microns, flowability of the gel type negative electrode is inferior and filling amount varies widely. Therefore, a particle size in the range of 100–900 microns is preferred.

On the other hand, when the particle size of the gelling agent B exceeds 100 microns, the battery cannot stand vibration and shock, and density of the gel type negative electrode decreases and therefore, amount of zinc active material cannot be secured. Thus, the particle size is preferably in the range of 100 microns or smaller. In connection with gel strength of the gelling agent A, when it is in the range of 15,000–50,000 dyne/cm$^2$, the elasticity which is the feature of the water-absorbing polymer exerts the highest effect on vibration and shock resistance and it is preferred to use the gelling agent A having a gel strength in the above range.

Next, explanation will be made on the effects of additives of oxides, hydroxides or sulfides of a metal selected from indium, tin and bismuth which are added to the gel type negative electrode.

A gel-like electrolyte which contains the three gelling agents used in the above example and additionally contains indium hydroxide was prepared. Actually, 0.75 g of the gelling agent A, 0.75 g of the gelling agent B and 1.0 g of the gelling agent C and additionally indium hydroxide in an amount as shown in Table 6 were added to 100 g of an electrolyte to prepare 300 g of a gel type negative electrode.

AA type alkaline batteries LR6 were fabricated using the resulting gel type negative electrodes and subjected to the same vibration test as in Example 1. The results are shown in Table 6.

TABLE 6

| Indium hydroxide (% by weight) | | | | | | | | |
|---|---|---|---|---|---|---|---|---|
| 0 | 0.001 | 0.005 | 0.010 | 0.050 | 0.100 | 0.250 | 0.500 | 1.000 |
| ○ | ○ | ⊙ | ⊙ | ⊙ | ⊙⊙ | ⊙⊙ | ⊙⊙ | ⊙⊙ |

It was confirmed that in the alkaline electrolyte, a part of the indium hydroxide was ionized and electrodeposited on the surface of zinc alloy by the principle of displacement plating. It is considered that the indium electrodeposited on the zinc particles has the action to improve the contact between zinc particles per se and strengthen the network of the zinc particles. Therefore, normal discharging can be attained without abrupt drop of voltage in the vibration test conducted with discharging.

In connection with the effect of the amount of indium hydroxide based on the zinc alloy, the vibration test result was improved with increase of the amount in the range of from 0.005% by weight to 1.0% by weight, but the result is no longer improved with further increase of the amount.

When the amount is less than 0.001% by weight, the effect of addition was not exhibited.

The same effect was obtained with addition of tin or bismuth.

As explained above, the present invention can provide an alkaline battery which can stand strong vibration and shock applied for a long time during discharging by using the three gelling agents of a crosslinked polyacrylate type water absorbing polymer, a crosslinked and branched type polyacrylic acid or a salt thereof and a granular crosslinked and branched type polyacrylic acid or a salt thereof which are specified in their dispersion viscosity and particle size.

What is claimed is:

1. An alkaline battery provided with a gelled negative electrode comprising a zinc alloy powder, a gelling agent and an alkaline electrolyte;

said gelling agent comprising a combination of:

a crosslinked polyacrylate water-absorbing polymer having a dispersion viscosity at 25° C. of at least 15,000 cps as a 0.5 wt % aqueous solution and having a particle size of 100–900 microns; a crosslinked and branched polyacrylic acid or a salt thereof having a dispersion viscosity at 25° C. of at least 15,000 cps as a 0.5 wt % aqueous solution and having a particle size of 100 microns or smaller; and a granular crosslinked and branched polyacrylic acid or a salt thereof having a dispersion viscosity at 25° C. of at least 15,000 cps as a 0.5 wt % aqueous solution and having a particle size of 100–900 microns;

the concentration of said crosslinked polyacrylate water-absorbing polymer being in the range of from 0.25 wt % to 3.0 wt %, the concentration of said crosslinked and branched polyacrylic acid or salt thereof being in the range of from 0.1 wt % to 1.0 wt %, the concentration of said granular crosslinked and branched polyacrylic acid or salt thereof being in the range of from 0.1 wt % to 2.0 wt %, and the total concentration of said gelling agent being in the range of more than 1.50 wt % but at most 4.0 wt %, and the total concentration of said gelling agent being in the range of more than 1.50 wt % but at most 4.0 wt %, all the concentrations being based on the weight of the alkaline electrolyte.

2. An alkaline battery provided with a gelled negative electrode comprising a zinc alloy powder, a gelling agent and an alkaline electrolyte;

said gelling agent comprising a combination of:

a crosslinked polyacrylate water-absorbing polymer having a dispersion viscosity at 25° C. of at least 15,000 cps as a 0.5 wt % aqueous solution and having a particle size of 100–900 microns; a crosslinked and branched polyacrylic acid or a salt thereof having a dispersion viscosity at 25° C. of at least 15,000 cps as a 0.5 wt % aqueous solution and having a particle size of 100 microns or smaller; and a granular crosslinked and branched polyacrylic acid or a salt thereof having a dispersion viscosity at 25° C. of at least 15,000 cps as a 0.5 wt % aqueous solution and having a particle size of 100–900 microns; said gelled negative electrode further comprising at least one metal-containing compound selected from the group consisting of an oxide, hydroxide and sulfide of a metal selected from the group consisting of indium, tin and bismuth in a concentration of 0.005–1.0 wt % based on the weight of said zinc alloy powder.

3. The alkaline battery according to claim 2, wherein said metal is indium.

4. An alkaline battery provided with a gelled negative electrode comprising a zinc alloy powder, a gelling agent and an alkaline electrolyte;

said gelling agent comprising:

a combination of a crosslinked polyacrylate water-absorbing polymer having a dispersion viscosity at 25° C. of at least 15,000 cps as a 0.5 wt % aqueous solution and having a particle size of 100–900 microns; a crosslinked and branched polyacrylic acid or a salt thereof having a dispersion viscosity at 25° C. of at least 15,000 cps as a 0.5 wt % aqueous solution and having a particle size of 100 microns or smaller; and a granular crosslinked and branched polyacrylic acid or a salt thereof having a dispersion viscosity at 25° C. of at least 15,000 cps as a 0.5 wt % aqueous solution and having a particle size of 100–900 microns;

the concentration of said crosslinked polyacrylate water-absorbing polymer being in the range of from 0.25 wt % to 3.0 wt %, the concentration of said crosslinked and branched polyacrylic acid or salt thereof being in the range of from 0.1 wt % to 1.0 wt %, the concentration of said granular crosslinked and branched polyacrylic acid or salt thereof being in the range of from 0.1 wt % to 2.0 wt %, and the total concentration of said gelling agent being in the range of more than 1.50 wt % but at most 4.0 wt %, all the concentrations being based on the weight of the alkaline electrolyte;

said gelled negative electrode further comprising at least one metal-containing compound selected from the group consisting of an oxide, hydroxide and sulfide of a metal selected from the group consisting of indium, tin and bismuth.

5. The alkaline battery according to claim 4, wherein said gelled negative electrode comprises said metal-containing compound in a concentration of 0.005–1.0 wt % based on the weight of said zinc alloy powder.

6. The alkaline battery according to claim 4, wherein said metal is indium.

* * * * *

UNITED STATES PATENT AND TRADEMARK OFFICE
CERTIFICATE OF CORRECTION

PATENT NO. : 5,587,254
DATED : December 24, 1996
INVENTOR(S) : Yuri KOJIMA, et al.

It is certified that error appears in the above-identified patent and that said Letters Patent is hereby corrected as shown below:

Column 8, lines 21-22, delete "and the total concentration of said gelling agent being in the range of more than 1.50 wt % but at most 4.0 %,"

Signed and Sealed this

Twenty-first Day of July, 1998

Attest:

BRUCE LEHMAN

Attesting Officer

Commissioner of Patents and Trademarks